(12) United States Patent
Schormans et al.

(10) Patent No.: US 9,129,418 B2
(45) Date of Patent: Sep. 8, 2015

(54) METHOD AND APPARATUS FOR DETERMINING OPTIMAL IMAGE VIEWING DIRECTION

(75) Inventors: Ron Hubertus Schormans, Heerlen (NL); Rianne Reinartz, Geleen (NL); Jean-Paul Aben, Limbricht (NL)

(73) Assignee: PIE MEDICAL IMAGING B.V., Maastricht (NL)

( * ) Notice: Subject to any disclaimer, the term of this patent is extended or adjusted under 35 U.S.C. 154(b) by 260 days.

(21) Appl. No.: 13/455,696

(22) Filed: Apr. 25, 2012

(65) Prior Publication Data

US 2012/0293498 A1 Nov. 22, 2012

(30) Foreign Application Priority Data

May 19, 2011 (EP) .................................... 11166739

(51) Int. Cl.
*G06T 19/00* (2011.01)

(52) U.S. Cl.
CPC ...................................... *G06T 19/00* (2013.01)

(58) Field of Classification Search
CPC .......... G06K 9/00; G06T 15/00; G06T 15/10; G06T 11/00; G06T 19/00
USPC .......... 345/419; 382/128, 130, 131, 132, 154; 600/407, 443, 447, 449
See application file for complete search history.

(56) References Cited

U.S. PATENT DOCUMENTS

| | | | |
|---|---|---|---|
| 6,359,960 B1 * | 3/2002 | Wahl et al. | 378/20 |
| 2003/0074011 A1 * | 4/2003 | Gilboa et al. | 606/130 |
| 2005/0008210 A1 * | 1/2005 | Evron et al. | 382/130 |
| 2005/0249327 A1 * | 11/2005 | Wink et al. | 378/8 |
| 2008/0041516 A1 * | 2/2008 | Chiu et al. | 156/173 |
| 2008/0221428 A1 * | 9/2008 | Flask et al. | 600/410 |
| 2010/0021025 A1 * | 1/2010 | Hof et al. | 382/128 |

OTHER PUBLICATIONS

Joon Hee Han; Contour Matching Using Epipolar Geometry; Pattern Analysis and Machine Intelligence, IEEE Transactions on (vol. 22, Issue: 4 ); Apr. 2000.*

Chen, S. James, 3-D Reconstruction of Coronary Arterial Tree to Optimize Angiographic Visualization, IEEE Transactions on Medical Imaging, vol. 19, No. 4, Apr. 2000.

Dumay, Adrie C.M., CDetermination of Optimal Angiographic Viewing Angles:Basic Principles and Evaluation Study, IEEE Transactions on Medical Imaging, vol. 13, No. 1, Mar. 1994.

(Continued)

*Primary Examiner* — Kee M Tung
*Assistant Examiner* — Michael Le
(74) *Attorney, Agent, or Firm* — Gordon & Jacobson, PC (57) ABSTRACT

A computer-implemented method for the determination of the optimal image viewing direction of an asymmetrical object is included. The method generates a 3D surface reconstruction of the object from 2D images of the object obtained from different perspectives. A point of interest can be specified in at least one of the used 2D images and an area of interest can be specified in the object where the point of interest lies within. A plane containing view directions with reduced foreshortening for the specified area of interest is generated and a 3D point corresponding to the specified point of interest is determined on the 3D surface reconstruction of the object. At least one particular view direction corresponding to the 3D point and located with the identified plane is considered as the optimal image viewing direction of the asymmetrical object. A corresponding apparatus and computer program are also disclosed.

30 Claims, 7 Drawing Sheets

(56) References Cited

OTHER PUBLICATIONS

Tu, Shengxian, Assessment of obstruction length and optimal viewing angle from biplane X-ray angiograms, Int J Cardiovasc Imaging (2010) 26:5-17.

Sato, Yoshinobu, A Viewpoint Determination System for Stenosis Diagnosis and Quantification in Coronary Angiographic Image Acquisition, IEEE Transactions on Medical Imaging, vol. 17, No. 1, Feb. 1998.

* cited by examiner

METHOD AND APPARATUS FOR DETERMINING OPTIMAL IMAGE VIEWING DIRECTION

CROSS-REFERENCE TO RELATED APPLICATION

This application claims priority from EP 11166739.0 filed on May 19, 2011 and which is hereby incorporated by reference in its entirety.

BACKGROUND

1. Field of the Invention

The present invention relates to a method and apparatus for acquiring and processing projection images of an object of interest, particularly angiographic images.

2. State of the Art

During clinical interventions it is important to obtain as much object information as possible to be able to accurately perform a procedure. For this reason the imaging methods usually adopted are those based on the use of apparatus acquiring high resolution volumetric images in order to have a better and more detailed picture of the object under examination.

Such apparatus, like CT and MR machines, besides having a large size and thus being cumbersome and expensive, provide a great amount of image data, whose processing is time-consuming and makes it impossible to perform imaging sessions in real-time. This drawback largely prevents the use of these machines during interventions.

For example in the field of Transcatheter Aortic Valve Implantation (TAVI), an intervention aiming at planning and placing an aortic valve implant, the gold standard imaging technique for selecting the type of valve and its relative positioning is a Multislice CT due to its high spatial resolution. However, such technique can be used only when planning the operation, for example in order to define the size of the valve, since it can be performed neither in real-time nor in a hemodynamic and/or heart surgery room (so called cathlab) during the intervention.

For this reason such type of interventions are generally performed under guidance of two-dimensional images acquired, for example, with angiographic X-ray systems of the so-called C-arm or L-arm type. These systems are used to acquire two-dimensional images, also called two dimensional projections or projection images, of the object under examination. Several perspectives can be obtained rotating the arm holding the X-ray source and detector with reference to the patient.

However, two-dimensional projection images, as those obtained with angiographic systems, suffer from the problem of foreshortening. Foreshortening is the event when an object seems compressed when viewed from a certain perspective, causing distortion of the information. This is particularly critical when, based upon such information, a clinical intervention is planned and/or performed, such as, for example, the placing of a stent in an artery or vessel in general or a valve implant. When using a two-dimensional imaging modality it is therefore important to acquire images from the right perspective.

The views in which an object of interest are visualized with minimum foreshortening are called optimal views as taught by the paper "Determination of optimal angiographic viewing angles: basic principles and evaluation study", Adrie C. M. Dumay, Johan H. C. Reiber, Jan J. Gerbrands, IEEE Trans. Med. Imaging, vol. 13, N. 1, March 1994.

In case of angiographic systems, the correct perspective is defined as the angulations of an X-ray system (both the system rotation and angulation) that contains as much information as possible needed for that procedure. This normally happens when the imaging system is positioned in a plane parallel to the main axis of the object i.e. when the projection is perpendicular to the object.

The most present developments in the field focus on one or multiple optimal projections that can be used during clinical interventions. These optimal projections are determined based solely on foreshortening. See for example Joel A. Garcia et al "Determination of optimal viewing regions for X-ray coronary angiography based on a quantitative analysis of 3D reconstructed models" International Journal of Cardiovascular Imaging, 2009, Volume 25, Number 5, Pages 455-462.

A large drawback of this approach is that it assumes that every optimal projection contains the same amount of information of the imaged object (that is that the imaged object is symmetrical). This leads to a variety of possible optimal projections that do not necessarily contain all the object information present in the images. This results in the potential usage of optimal projections that are only suitable for symmetrical objects.

However, as in clinical practice the objects that are dealt with are asymmetrical (see FIG. 1), a recording that is perpendicular to the object does not necessarily contain all the needed information. It would thus be desirable to determine the optimal viewing angle or optimal projection that not only minimizes foreshortening, but also contains all relevant information of the asymmetrical object or device for that clinical intervention.

As the existing developments in the field only focus on the foreshortening aspect, it is presently necessary for a clinician to obtain such an optimal viewing angle by trial and error during an intervention. This procedure is time consuming and is a burden for the patient because several acquisitions, whether or not supported by administration of a contrast agent, have to be made before the desired optimal view has been found. How many acquisitions are needed depends on the experience of the clinician and the patient anatomy.

There's thus a need for a method that would help the clinician to choose the correct perspective from which a three-dimensional object is to be optimally viewed not only in terms of reduction of foreshortening, but also in terms of completeness of shown information. Such information varies from case to case and thus cannot be fixed in advance in each imaging procedure. It is something related to the specific scope an image is taken for.

It is assumed clear that it is the objective of every imaging session to obtain and use as much image information as possible and to restrict the amount of information loss especially with asymmetrical objects. Not every procedure however classifies the same image information as important for the current procedure.

For this reason the prior art is mainly aimed at finding optimal projections reducing the foreshortening problem leaving to the expertise of the clinician the job of finding optimal projections for specific applications with trial and error procedures.

SUMMARY OF THE INVENTION

It is thus an object of the present application to provide a method and apparatus for determining optimal image viewing direction in terms of reduced foreshortening and relevancy of information, particularly for clinical interventions.

It is a further object of the present application to determine such optimal image viewing direction in a manner that reduces the number of acquisitions necessary and thus patient exposure to radiation and contrast agent.

Such objects are realized in accordance with a first aspect of the present application by a computer-implemented method of processing two-dimensional images of an asymmetrical object. The method includes:

a) generating a three-dimensional surface reconstruction of the object from a plurality of two-dimensional images of the object which have been obtained from different perspectives;

b) generating data that specifies a point of interest in at least one two-dimensional image used to generate the three-dimensional surface reconstruction of the object in a);

c) generating data that specifies position of an area of interest in the object, wherein the point of interest of b) lies within the area of interest;

d) identifying a plane containing view directions with reduced foreshortening for the area of interest specified by the data of c);

e) determining a three-dimensional point on the three-dimensional reconstruction of the object generated in a), wherein the three-dimensional point corresponds to the point of interest specified by the data of b); and f) generating data representing at least one particular view direction contained with the plane identified in d), wherein the at least one particular view direction corresponds to the three-dimensional point determined in e).

According to this aspect, the method determines the optimal viewing direction for an image in terms of reduced foreshortening as well as relevancy of information. Such information is not known a priori, but varies as a function of the type of application considered. The method can accommodate many different applications (such as imaging of asymmetrical objects) because a point or area of interest is used to determine which object information is classified as relevant.

By automating the determination of the optimal viewing direction in terms of reduced foreshortening as well as relevancy of information, trial and error of different viewing directions is avoided and experience is no longer determinant, which decreases the amount X-ray radiation and of contrast agent needed for obtaining the correct image for the procedure (for those applications requiring usage of contrast agents) and leads to a quicker working time.

According to an embodiment, the plane identified in d) is perpendicular to main orientation of the area of interest specified by the data of c). Moreover, the intersection of the plane identified in d) and the three-dimensional reconstruction of the object generated in a) defines a geometric figure having a center of symmetry. The particular view direction of f) passes through both the center of symmetry and the three-dimensional point determined in e).

The point of interest specified by the data of b) is preferably chosen on at least two two-dimensional images used for the three-dimensional reconstruction of the object. The choice of the point of area of interest can be completely left to the skill of the user or may be, at least partially, assisted, for example by showing a zone on the second two-dimensional image where the corresponding point of interest within such second two-dimensional image is to be expected. Alternatively the point or area of interest can be selected on only one of the two-dimensional images used for the three-dimensional reconstruction of the object.

The three-dimensional point of e) can be determined as a point on the three-dimensional reconstruction of the object that is closest to the point of interest specified by the data of b). For example, the three-dimensional point of e) can be determined by back-projecting the three-dimensional reconstruction of the object generated in a) onto at least one two-dimensional image containing the point of interest specified by the data of b), finding a two-dimensional point on the back-projected image that is closest to such point of interest, and determining the point on the three-dimensional reconstruction of the object generated in a) that corresponds to such two dimensional point on the back-projected image.

Preferably the object or a part thereof is segmented in at least two of the two-dimensional images used for the three-dimensional reconstruction. The point or area of interest can manually or automatically be identified on the two-dimensional images used for the three-dimensional reconstruction of the object or directly located on the 3D model itself According to an embodiment, the two-dimensional images of the object are angiographic images showing part or the whole aortic root, the point or area of interest being a coronary leaflet, particularly the right coronary leaflet. In this case the optimal view direction is preferably a two-dimensional image showing the right coronary leaflet in a central position with the posterior and left leaflets respectively located at opposite sides of such right coronary leaflet.

In general all the steps of the method according to the invention are not to be considered strictly in the order presented, but can be equally performed in any other meaningful sequence. For example the point of interest can be defined after the 3D reconstruction. Also the optional segment definition within the 3D reconstruction can be determined before 3D reconstruction and/or the point of interest determination.

The method is typically performed by a data processing system with access to two-dimensional images of an object of interest obtained from different perspectives.

The present application also relates to a computer product directly loadable into the memory of a data processing system (e.g., computer) and comprising software code portions for performing the method as disclosed above when the product is run on the data processing system.

According to another aspect, the present application also relates to an apparatus for acquiring two-dimensional images of a three-dimensional object. The apparatus comprises means for receiving from a user indications on the position of a point or area of interest in at least two two-dimensional images of the object obtained from different perspectives and processing means programmed for performing the method according to the invention to determine a viewing direction for obtaining an optimal image of the object in terms of reduced foreshortening and relevancy of information.

Advantageously, such an apparatus could be the same machine used for acquiring and/or reconstructing the image data, such as CT, MRI, Ultrasound or X-ray machines. Particularly it is an angiographic apparatus of the C-arm or L-arm type with X-ray source and image intensifier respectively located at opposite sides of the arm, such arm being movable at least according to a rotation angle and an angulation angle with reference to a patient to obtain bi-dimensional images from different perspectives, the processing means being programmed to calculate rotation and angulation angles of the arm for obtaining optimal projection images.

According to an embodiment, the angiographic apparatus comprises actuating means to automatically or semi-automatically rotate the arm, and/or display means for providing to a user indications for manually rotating the arm, according to rotation and angulation angles calculated for obtaining an optimal projection image. Advantageously, among two perspectives having the same direction, the processing means is programmed to select the one corresponding to a rotation and angulation angle within the range of possible rotation and angulation angles of the apparatus.

The method can also be realized on other data processing systems (such as a general purpose processor or processor dedicated to perform the methodology as described herein, or, in a particularly advantageous configuration, the same, or part of the same, processing means that subtends the main image acquisition functionalities of the machine thus obtaining a very compact and powerful apparatus.

BRIEF DESCRIPTION OF THE DRAWINGS

The characteristics of the invention and the advantages derived therefrom will be more apparent from the following description of non-limiting embodiments, illustrated in the annexed drawings, in which.

DETAILED DESCRIPTION OF A PREFERRED EMBODIMENT

Figure 1:
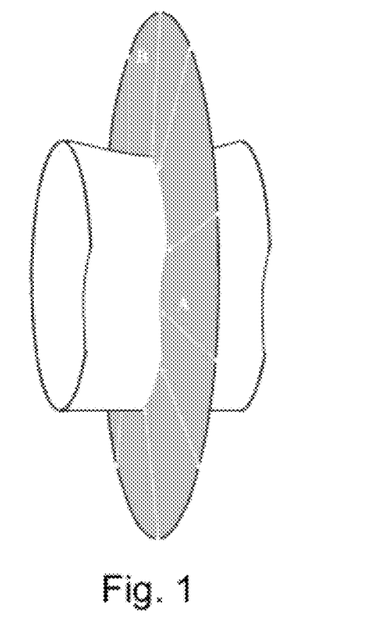
FIG. 1 is a schematic illustration of all possible optimal projection view directions for an asymmetrical object.
Figure 2A:
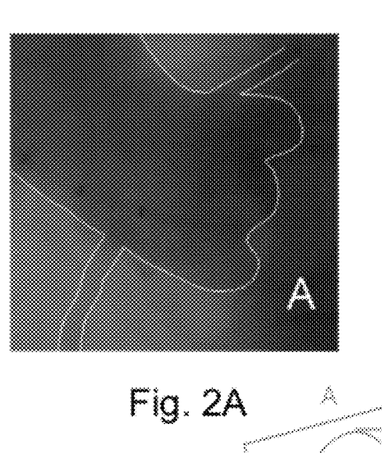
FIGS. 2A and 2B are schematic illustration of potential errors in the evaluation of the coronary root from two orthogonal views.
Figure 2B:
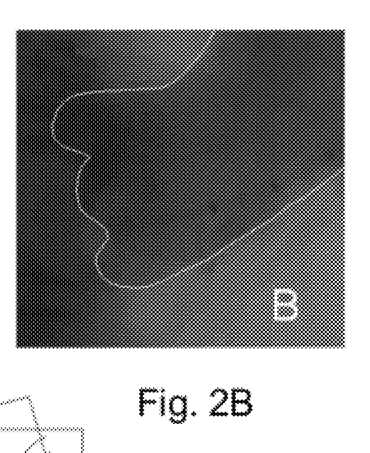
Figure 2C:
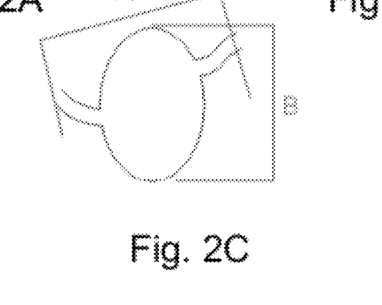
FIG. 2C is a cross-sectional schematic of the coronary root of FIGS. 2A and 2B, showing the view directions for FIGS. 2A and 2B, respectively.

FIG. 1 shows a tubular organ, like an artery, having an elliptical cross section. All possible optimal projection view directions for this asymmetrical object lie on the indicated grey circle which is perpendicular to the axis of the object. However, as shown in FIGS. 2A and 2B, an optimal projection view direction chosen at point B (FIG. 2B) will contain different object information than an optimal projection view direction chosen from point A (FIG. 2A). Specifically, FIGS. 2A and 2B show the difference in coronary artery visibility in the coronary root when looking from different orthogonal views. In these two figures, FIG. 2A and FIG. 2B, the aortic root (schematically shown in FIG. 2C) is seen from two perspectives. For the view direction of FIG. 2A, the coronary arteries that arise from the aortic root can be seen clearly (see the upper left FIG. 2A. However, for the view direction of FIG. 2B, at the same aortic root both coronary arteries are absent in the image information (see the upper right of FIG. 2B). The absence of the coronary arteries in the image information of FIG. 2B can lead to serious complications during an intervention. If, for instance, a stent is placed in front of the coronary arteries the blood flow to the coronary arteries is blocked leading to irreversible damage for the patient.

Figure 3:
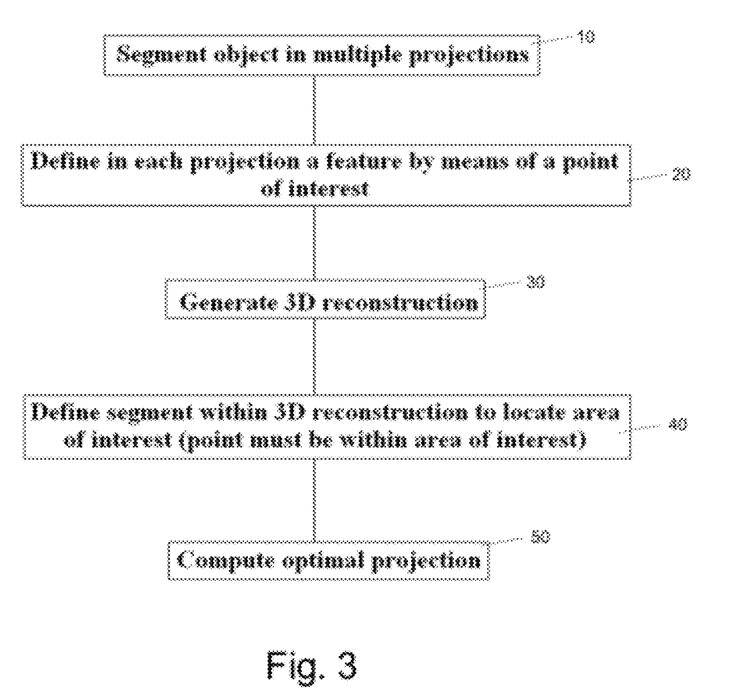
FIG. 3 is a flowchart illustrating the operations according to an embodiment of the present application.
Figure 15:
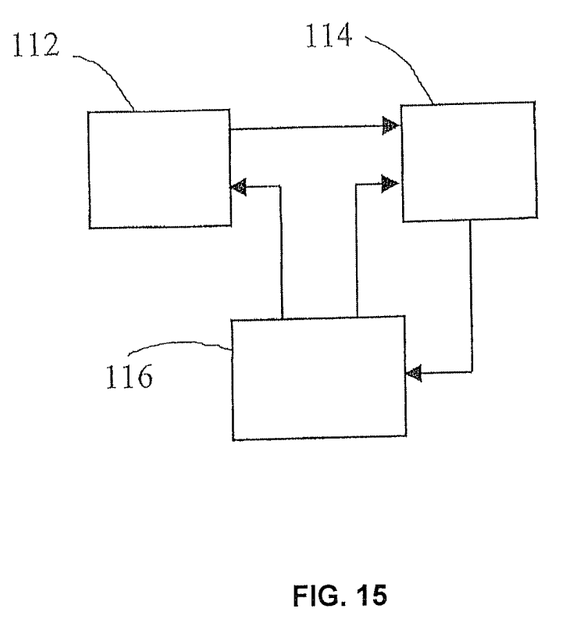
FIG. 15 is a functional block diagram of an exemplary bi-plane angiographic system.

Turning now to FIG. 3, there is shown a flow chart illustrating the operations according to an embodiment of the present application. The operations employ an imaging system capable of acquiring and processing two-dimensional images of a vessel organ (or portion thereof) or other object of interest. For example a bi-plane or single plane angiographic system can be used such as those manufactured, for example, by Siemens (Artis zee Biplane) or Philips (Allura Xper FD). FIG. 15 is a functional block diagram of an exemplary bi-plane angiographic system, which includes a bi-plane angiographic imaging apparatus 112 that operates under commands from user interface module 116 and will provide data to data processing module 114. The bi-plane angiographic imaging apparatus 112 captures two-dimensional X-ray images of the vessel organ of interest for example in the postero-anterior (PA) direction and in the lateral direction (which is substantially orthogonal to the PA direction). The bi-plane angiographic imaging apparatus 112 typically includes a first X-ray source and detector pair mounted on one arm of a supporting gantry as well as a second X-ray source and detector pair mounted on second arm of the supporting gantry. The gantry provides for positioning the arms of the first and second X-ray source and detector pairs at various angles with respect to a patient who is supported on a table between the X-ray source and detector of the respective pair. The data processing module 114 may be realized by a personal computer, workstation or other computer processing system. The data processing module 114 processes the two-dimensional images captured by the bi-plane angiographic imaging apparatus 112 to generate data as described herein. The user interface module 116 interacts with the user and communicates with the data processing module 114. The user interface module 116 can include different kinds of input and output devices, such as a display screen for visual output, a touch screen for touch input, a mouse pointer or other pointing device for input, a microphone for speech input, a speaker for audio output, a keyboard and/or keypad for input, etc. The data processing module 114 and the user interface module 116 cooperate to carry out the operations of FIG. 3 as described below.

The operations of FIG. 3 can also be carried out by software code that is embodied in a computer product (for example, an optical disc or other form of persistent memory such as a USB drive or a network server). The software code can be directly loadable into the memory of a data processing system for carrying out the operations of FIG. 3 as described below.

In this example it is assumed that the imaging system has acquired and stored at least two two-dimensional images (referred to herein as "projection images") of an object of interest.

In step 10, the data processing module 114 segments the object of interest in a number of projection images, preferably in at least two projection images acquired from different perspectives (i.e., different viewing directions). This can be done according to any known method such as the one disclosed in Y. Jiang et. al. "X-ray image segmentation using active contour model with global constraints," IEEE Symposium on Computational Intelligence in Image and Signal Processing, 2007, CIISP 2007 pages 240-245. The results are projection images with the border 101 of the object of interest overlaid, as for example shown in FIG. 9 and FIG. 10.

Figure 9:
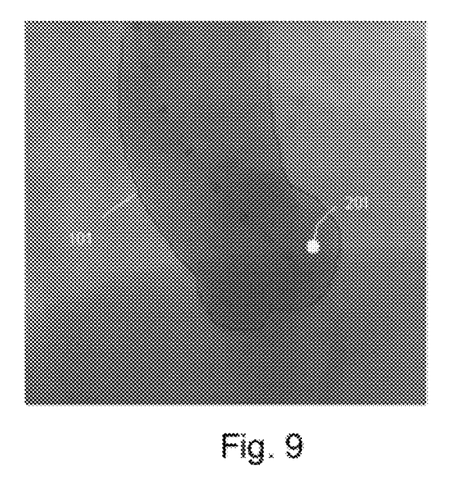
FIG. 9 is the image of FIG. 7 segmented and with a coronary leaflet indicated as point of interest.
Figure 10:
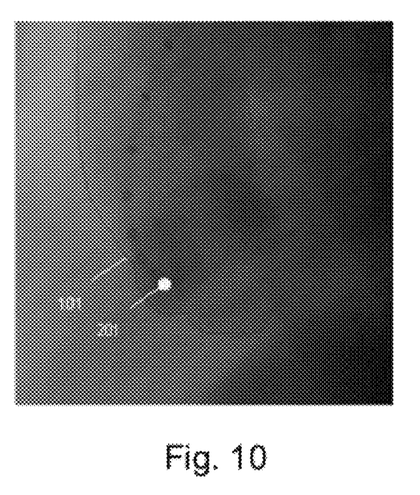
FIG. 10 is the image of FIG. 8 segmented and with the corresponding coronary leaflet indicated as point of interest.

In step 20, the data processing module 114 and the user interface module 116 cooperate to interact with the user to specify the position of a point of interest in the object. For example in case the object is a coronary root, such point can lie on the right coronary leaflet 201 as indicated in FIG. 9 and FIG. 10. This step can be accomplished by interacting with the user to specify the position of a point of interest in a first two-dimensional image of the object, automatically indicating a region in a second two-dimensional image to provide a guidance to assist the user in selecting the corresponding point or area of interest within such second two-dimensional image, and then interacting with user to specify the position of such point of interest within such region of the second two-dimensional image. The automatic indication of the region in the second two-dimensional can take into account the properties of the epipolar geometry of the object as taught, for example, by Joon Hee Han et al. "Contour matching using epipolar geometry," Pattern Analysis and Machine Intelligence, Volume 22, Issue 4, April 2000, Pages 358-370.

Figure 4:
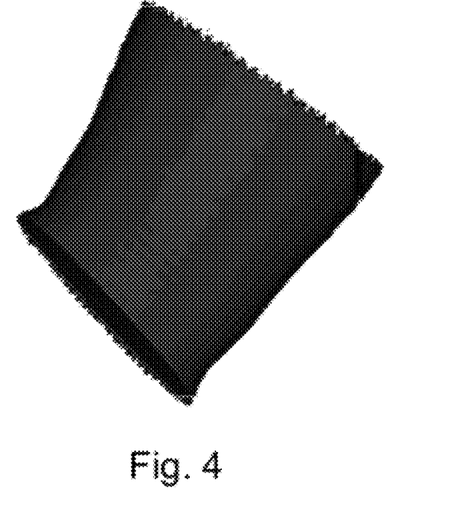
FIG. 4 is a schematic illustration of a 3D reconstruction of an object.

In step 30, the data processing module 116 processes the projections of the object to generate a 3D model of the object, which is also called a three-dimensional reconstruction or three-dimensional surface reconstruction of the object. This is known and can be done, for example, according to the paper "A novel dedicated 3-dimensional quantitative coronary analysis methodology for bifurcation lesions", Yoshinobu Onuma, Chrysafios Girasis, Jean-Paul Aben, Giovanna Sarno, Nicolo Piazza, Coen Lokkerbol, Marie-Angel Morel, Patrick W. Serruys, EuroIntervention 2011; 6:1-00. The result of this step is a three-dimensional surface reconstruction of the object of interest as shown in FIG. 4 for the case of a tubular organ.

Figure 5:
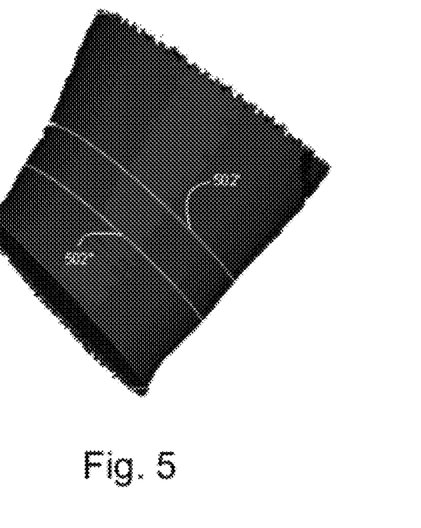
FIG. 5 is the same schematic illustration of FIG. 4 with a section of interest indicated.
Figure 6:
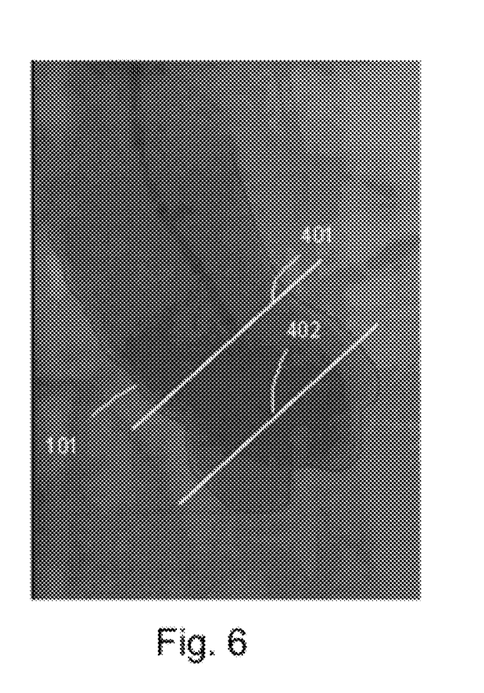
FIG. 6 shows the beginning and the end of a two-dimensional section that is used to calculate all possible views perpendicular to the corresponding 3D section.

In step 40, the data processing module 114 and the user interface module 116 cooperate to interact with the user to specify a segment of the 3D model of the object (also referred to herein as a "segment of interest") that will be used for further calculations. For example, the user can specify boundaries 502', 502" that define a segment of the 3D model of the object as shown in FIG. 5. Such boundaries can be specified directly on the 3D model of the object. Alternatively, the user can specify two lines 401, 402 in one of the projection images used to generated the 3D model in step 30 as shown in FIG. 6. One of the lines represents the beginning and the other line represents the end of the segment. This is preferably done in the projection images because the segment of interest is best seen there. In this case, the lines 401, 402 are mapped to corresponding three-dimensional planes that define the boundaries of the segment in the 3D model.

In step 50, the data processing module 114 utilizes the feature indicated by the point of interest specified in step 20 to determine at least one viewing direction with reduced foreshortening for the segment of interest as specified in step 40. Step 50 can be accomplished by identifying a plane containing view directions with reduced foreshortening for the segment of interest of step 40. Such plane can lie perpendicular to the segment of interest, or perpendicular to the whole 3D object. The plane can be identified, for example, using the methodology described in the paper "Determination of optimal angiographic viewing angles: basic principles and evaluation study", Adrie C. M. Dumay, Johan H. C. Reiber, Jan J. Gerbrands, IEEE Trans. Med. Imaging, vol. 13, N. 1, March 1994. A view direction with reduced foreshortening (also referred to as an "optimal view direction" herein) is perpendicular to the orientation of the 3D model or a section thereof. Because the model can be looked at from different angles that are all perpendicular to it, this step gives us a various amount of optimal view directions that all lie on planes perpendicular to the object (see FIG. 1).

In step 50, the data processing module 114 also generates data representing position of a three-dimensional equivalent point for the point of interest identified in step 20. This operation can involve matching the point of interest as specified in a number of projection images in step 20 as described above. The generation of the data representing position of a three-dimensional equivalent point can use techniques similar to the ones used for the 3D reconstruction as described in step 30. The position of the 3D equivalent point is then used to determine a three-dimensional point that lies on the surface of the 3D model that was generated in step 30, that point being the point on the 3D surface of the 3D model that is closed to the three-dimensional equivalent point. In this manner, the operations identify the best representation of the point of interest of step 20 on the surface of the 3D model.

In the situation where the user has indicated a point of interest in only one projection image, the 3D model is back projected to the projection image in which the point of interest was indicated. The point of interest is then matched to the projected model to find the point on the projected model that is closest to the point of interest. This point on the projected model is the three-dimensional equivalent point for the point of interest. This is preferably achieved when the point of interest is situated in the section of the 3D model facing the user, i.e. the point of interest as indicated by the user does not lie on the backside of the 3D model.

Figure 11:
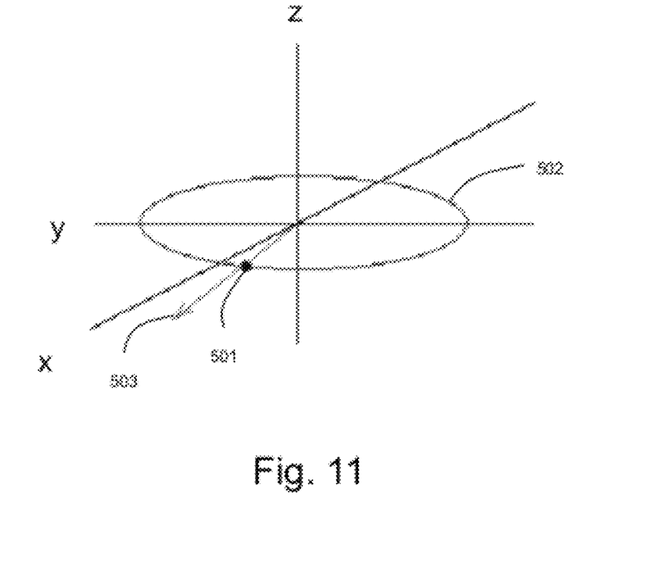
FIG. 11 is a simplified sketch showing the optimal direction vector for a point of interest.

In step 50, the data processing module 114 selects a view direction from the possible view directions with reduced foreshortening that lie in the plane perpendicular to the segment of interest (or perpendicular to the whole 3D model). The selected view direction contains the three-dimensional equivalent point. In one embodiment, the selected view direction is determined by deriving the center of the projection outline 502 of the 3D model in the plane perpendicular to the segment of interest (or perpendicular to the whole 3D model) at the height of the three dimensional equivalent point 501 as shown in FIG. 11. The selected view direction (labeled 503) starts from this center and heads outward through the three dimensional equivalent point 501 as shown in FIG. 11.

Because the view direction 503 is constructed using the plane perpendicular to the segment of interest (or perpendicular to the whole 3D model), it is ensured that the view direction 503 is perpendicular to the indicated section. Also because the direction runs through the three dimensional equivalent point 501, it is ensured that an optimal projection view derived from this direction vector contains information about the indicated point of interest 201.

Figure 12:
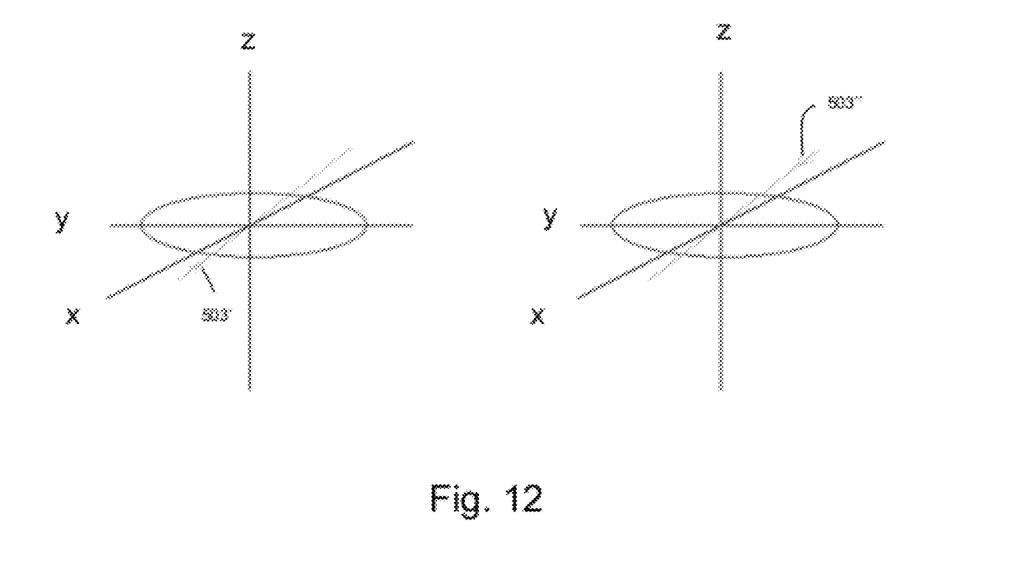
FIG. 12 shows two optimal views having the same optimal direction.

From the view direction 503 two viewing vectors 503', 503" can be determined, one looking along the direction vector and one looking against the direction vector. Each viewing vector 503', 503" represents an image perspective indicated by the angulations of an x-ray system (both the systems rotation and angulation).

One of the two image perspectives will probably lie outside of the range of the used imaging system, therefore this image perspective cannot be recorded. This can be due, for instance, to the fact that the arm of the imaging system can only rotate and/or angulate a certain amount of degrees and is therefore not able to achieve one of the given perspectives. This will result in the other image perspective being the suitable one. This is dependent on the imaging system being used.

Using this outcome, the data processing module 114 and/or the user interface module 116 can operate to acquire (or display) the image that belongs to this optimal projection (i.e., the projection image for the view direction 503' or 503") and continue the procedure with the maximum amount of object information and the least amount of time and burden to the patient spent on finding that information. During such operations, the data processing module 114 can calculate rotation and angulation angles of the arm of the imaging system that correspond to the optimal projection (view direction 503' or 503"). Moreover, the user interface module 116 can display user indications for manually rotating the arm of the imaging system into a position that correspond to the optimal projection (view direction 503' or 503") or the data processing module 114 automatically rotates the arm of the imaging system to the calculated optimal projection.

Figure 7:
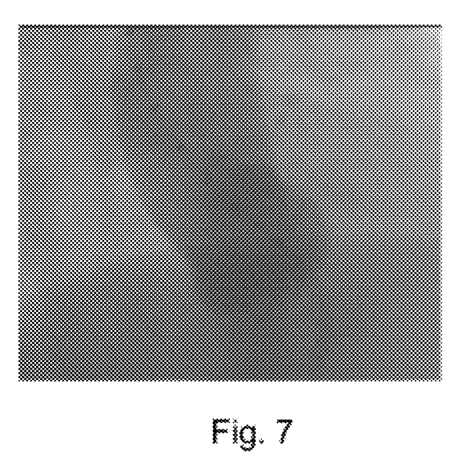
FIG. 7 is a first two-dimensional angiographic image which shows the aortic root from behind.
Figure 8:
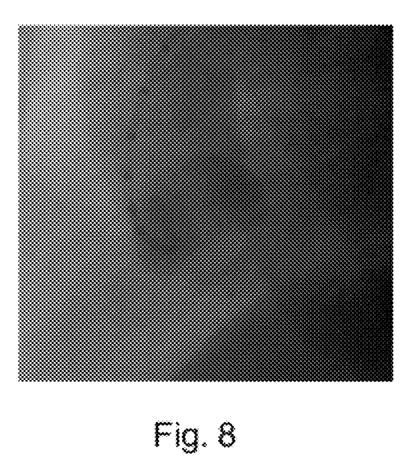
FIG. 8 is a second two-dimensional angiographic image which shows the aortic root from below.
Figure 13:
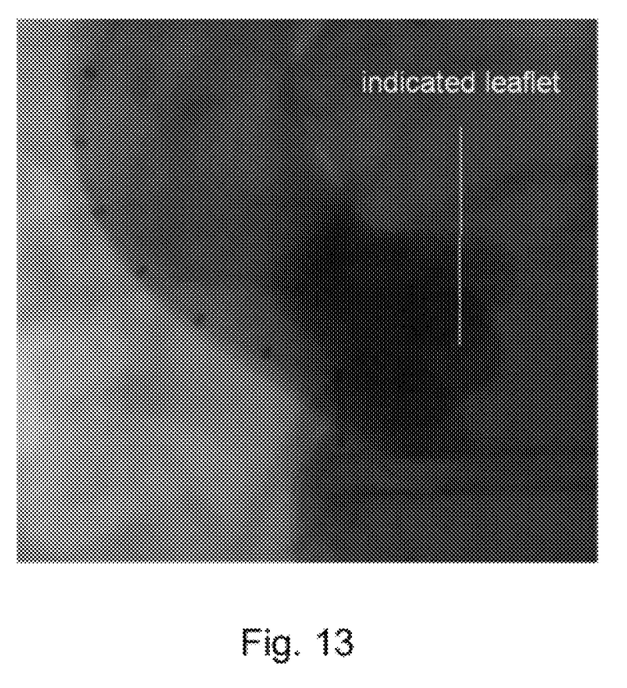
FIG. 13 is a two-dimensional angiographic image of the aortic root of FIGS. 7 to 10 acquired from a view direction determined according to the operations of FIG. 3.
Figure 14:
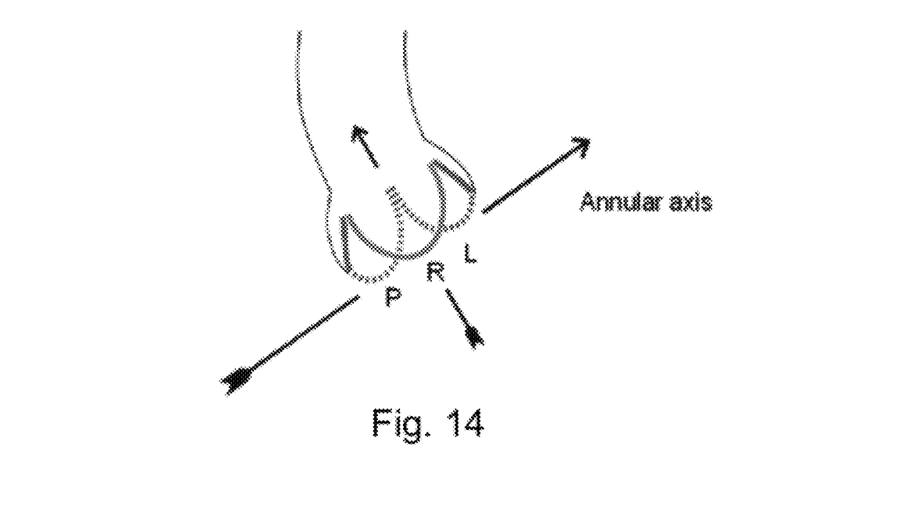
FIG. 14 is a schematic drawing of a two-dimensional image acquired from a view direction determined according to the operations of FIG. 3, which is used for replacing the aortic leaflet or placing a stent.

FIG. 13 shows the optimal projection image obtained processing the two images of FIGS. 7 and 8 with a method according to the invention. FIG. 14 is a sketch of the image so obtained which represents a view of the aortic root with the right leaflet R shown between the non-coronary (posterior) P and the left leaflet L of the aortic valve, a perspective considered particularly useful for TAVI procedures.

There have been described and illustrated herein several embodiments of a method and apparatus for determining optimal image viewing direction in terms of reduced foreshortening and relevancy of information. While particular embodiments of the invention have been described, it is not intended that the invention be limited thereto, as it is intended that the invention be as broad in scope as the art will allow and that the specification be read likewise. For example, the data processing operations of FIG. 3 can be performed offline on images stored in digital storage, such as a picture archiving and communication system (PACS) commonly used in the medical imaging arts. It will therefore be appreciated by those skilled in the art that yet other modifications could be made to the provided invention without deviating from its spirit and scope as claimed.

The invention claimed is:

1. A computer-implemented method of processing two-dimensional images of an asymmetrical object, the method comprising:
   a) generating a three-dimensional surface reconstruction of the object from a plurality of two-dimensional images of the object which have been obtained from different perspectives;
   b) generating data that specifies a user-selected point of interest in at least one two-dimensional image used to generate the three-dimensional surface reconstruction of the object in a);
   c) generating data that specifies position of an area of interest in the object, wherein the user-selected point of interest of b) lies within the area of interest;
   d) identifying a plane containing view directions with reduced foreshortening for the area of interest specified by the data of c);
   e) determining a three-dimensional point on the three-dimensional surface reconstruction of the object generated in a), wherein the three-dimensional point corresponds to the user-selected point of interest specified by the data of b); and
   f) automatically generating data representing at least one particular view direction contained with the plane identified in d), wherein the at least one particular view direction corresponds to the three-dimensional point determined in e);
   wherein the three-dimensional point of e) is determined by back-projecting the three-dimensional surface reconstruction of the object generated in a) onto at least one two-dimensional image containing the user-selected point of interest specified by the data of b), finding a two-dimensional point on the back-projected image that is closest to such user-selected point of interest, and equating the three-dimensional point to the point on the three-dimensional surface reconstruction corresponding to such two-dimensional point on the back-projected image.

2. A computer-implemented method according to claim 1, further comprising:
   g) using the data generated in f) during a clinical intervention of the object.

3. A computer-implemented method according to claim 2, wherein:
   in g), the data generated in f) is used to acquire at least one two-dimensional image of the object corresponding to the least one particular view direction represented by the data generated in f).

4. A computer-implemented method according to claim 2, wherein:
   in g), the data generated in f) is used to display at least one two-dimensional image of the object corresponding to the least one particular view direction represented by the data generated in f).

5. A computer-implemented method according to claim 1, wherein:
   the plane identified in d) is perpendicular to main orientation of the area of interest specified by the data of c).

6. A computer-implemented method according to claim 1, wherein:
   intersection of the plane identified in d) and the three-dimensional surface reconstruction of the object generated in a) defines a geometric figure having a center of symmetry.

7. A computer-implemented method according to claim 6, wherein:
   the at least one particular view direction of f) passes through both the center of symmetry and the three-dimensional point determined in e).

8. A computer-implemented method according to claim 1, wherein:
   the three-dimensional point of e) lies on the three-dimensional surface reconstruction of the object generated in a) and is closest to the user-selected point of interest specified by the data of b).

9. A computer-implemented method according to claim 1, wherein the data of b) is derived by:
   interacting with the user to specify the position of the user-selected point of interest in a first two-dimensional image of the object;
   automatically indicating a region in a second two-dimensional image to provide a guidance to assist the user in selecting the corresponding user-selected point of interest within such second two-dimensional image;
   interacting with the user to specify the position of such user-selected point of interest within such region of the second two-dimensional image; and
   calculating position of a three-dimensional point equivalent to the user-selected point of interest in the first and second two-dimensional images.

10. A computer-implemented method according to claim 9, wherein:
the three-dimensional point of e) lies on the three-dimensional surface reconstruction of the object generated in a) and is closest to the position of the three-dimensional point equivalent to the user-selected point of interest in the first and second two-dimensional images.

11. A computer-implemented method according to claim 1, wherein:
the object or a part thereof is segmented in at least two of the two-dimensional images used for the three-dimensional surface reconstruction of the object generated in a).

12. A computer-implemented method according to claim 1, wherein:
the data of b) is derived by manually or automatically identifying a point of interest on at least one two-dimensional image used for the three-dimensional surface reconstruction of the object generated in a).

13. A computer-implemented method according to claim 1, wherein:
the object comprises part or whole of an aortic root of a patient.

14. A computer-implemented method according to claim 13, wherein:
the area of interest comprises part or whole of the coronary leaflet of the patient.

15. A computer-implemented method according to claim 13, wherein:
the area of interest comprises part or whole of the right coronary leaflet of the patient.

16. A computer-implemented method according to claim 15, wherein:
the data generated in f) represents at least one particular view direction showing the right coronary leaflet in a central position with the posterior and left leaflets respectively located at opposite sides of such right coronary leaflet.

17. A computer-implemented method according to claim 1, wherein:
the generation of the three-dimensional surface reconstruction of the object in a) is based on the segmentation of the object in two two-dimensional images of the object.

18. A computer-implemented method according to claim 1, wherein:
the user-selected point of interest of b) is positioned on one or two two-dimensional images of the object.

19. A computer-implemented method according to claim 1, wherein:
the user-selected point of interest of b) is specified before or after the generation of the three-dimensional surface reconstruction of the object in a).

20. A computer-implemented method according to claim 1, wherein:
the three-dimensional point of e) lies on the surface of the object.

21. A computer-implemented method according to claim 1, wherein:
the user-selected point of interest of b) and the corresponding three-dimensional point of e) are used as extra information regarding the at least one particular view direction of f).

22. A computer-implemented method according to claim 1, wherein:
the area of interest of c) is specified on one or two two-dimensional images of the object or on the three-dimensional surface reconstruction of the object of a).

23. A computer-implemented method according to claim 1, wherein:
the area of interest of c) is specified by the user.

24. A computer-implemented method according to claim 1, wherein:
the intersection of the three-dimensional point of e) and the plane of d) specifies a pair of view directions orthogonal to the plane of d), wherein one view direction of the pair of view directions is selected as an optimal view direction based on range restrictions of the imaging system.

25. A non-transitory computer readable medium encoded with instructions comprising software code portions for performing the computer-implemented method of claim 1.

26. An apparatus for acquiring and processing two-dimensional images of an asymmetrical object, the apparatus having a data processor that performs the computer-implemented method of claim 1.

27. An apparatus according to claim 26, further comprising:
an X-ray source and detector respectively located at opposite sides of an arm, such arm being movable at least according to a rotation angle and an angulation angle with reference to a patient to acquire two-dimensional images from different perspectives.

28. An apparatus according to claim 27, wherein:
the data processor is adapted to calculate rotation and angulation angles of the arm according to the data generated in e) during a clinical intervention of the object.

29. An apparatus according to claim 27, further comprising:
actuating means for automatically or semi-automatically rotating the arm; and
display means for providing to a user indications for manually rotating the arm according to the data generated in e) during a clinical intervention of the object.

30. An apparatus according to claim 27, wherein:
in e), the data processor generates the data representing at least one particular view direction according to a range of possible rotation and angulation angles of the arm.

* * * * *